United States Patent [19]

Morigaki

[11] Patent Number: 4,646,181

[45] Date of Patent: Feb. 24, 1987

[54] MAGNETIC HEAD RETAINING DEVICE

[75] Inventor: Masamichi Morigaki, Kusatsu, Japan

[73] Assignee: Omron Tateisi Electronics Co., Kyoto, Japan

[21] Appl. No.: 609,135

[22] Filed: May 11, 1984

[30] Foreign Application Priority Data

May 12, 1983 [JP] Japan .............................. 58-71250[U]

[51] Int. Cl.⁴ ......................... G11B 5/48; G11B 25/04
[52] U.S. Cl. ........................................ 360/104; 360/2
[58] Field of Search ........................... 360/104, 2, 109; 235/449, 450

[56] References Cited

U.S. PATENT DOCUMENTS

| 3,836,753 | 9/1974 | Pass | 235/449 |
| 4,304,992 | 12/1981 | Kobayashi et al. | 360/2 |
| 4,363,045 | 12/1982 | Herman | 360/104 |
| 4,375,071 | 2/1983 | Crowley et al. | 360/104 |

FOREIGN PATENT DOCUMENTS

| 58-9262 | 1/1983 | Japan | 360/2 |
| 1277569 | 6/1972 | United Kingdom . | |
| 2107915A | 5/1983 | United Kingdom . | |

Primary Examiner—John H. Wolff
Assistant Examiner—Matthew J. Bussan
Attorney, Agent, or Firm—Stevens, Davis, Miller & Mosher

[57] ABSTRACT

A magnetic head retaining device, comprising a support member carrying a magnetic head which contacts a magnetic recording medium such as a magnetic card moving in one direction relative thereto and at least a pair of support holes provided downstream and upstream to the magnetic head on an imaginary line passing through the magnetic head in parallel to the direction of the motion of the magnetic recording medium and a mounting member having at least a pair of legs inserted through the corresponding support holes and a spring portion for biasing the legs downwards. Each of the legs is provided with a step for restricting the upward motion of the supporting member. By forming the mounting member out of a single plate, the device may have the flexibility required for achieving an intimate contact between the magnetic head and the magnetic medium and the rigidity required for accurately positioning the magnetic head.

7 Claims, 4 Drawing Figures

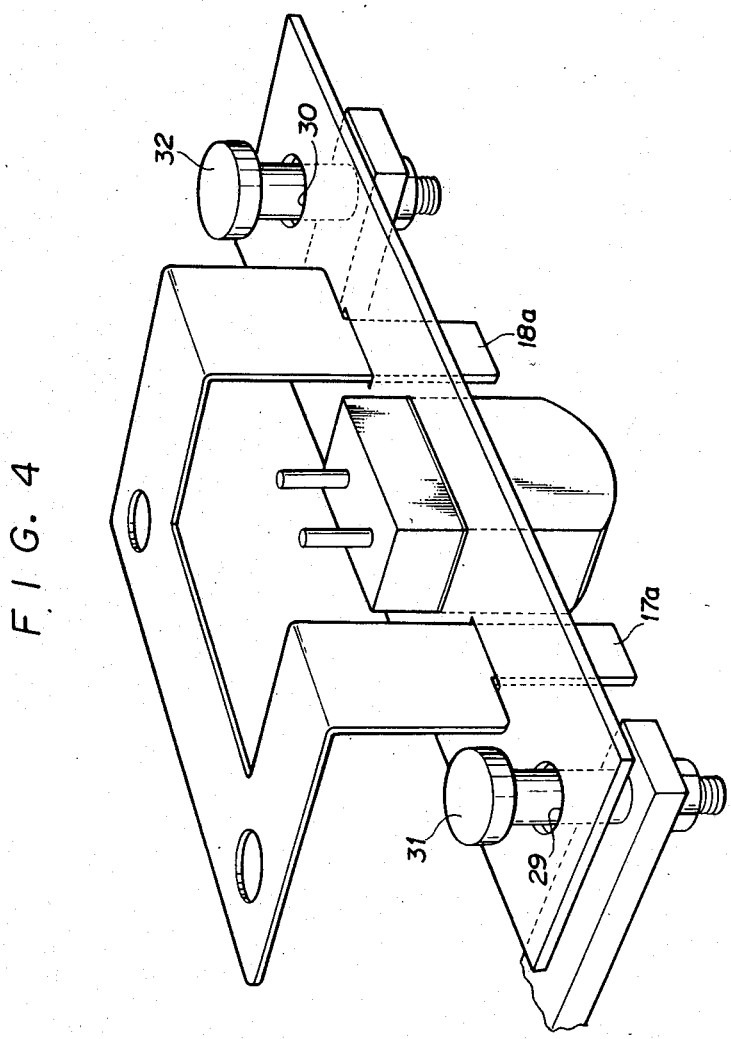

MAGNETIC HEAD RETAINING DEVICE

BACKGROUND OF THE INVENTION

The present invention relates to a device for retaining a magnetic head for writing or reading information into or out from a magnetic recording medium such as a magnetic card, and in particular to such a device which allows the magnetic head to tilt and to move vertically so as to achieve a close contact with the margnetic recording medium.

To the end of accurately writing or reading information into or out from a magnetic recording medium with a magnetic head, it is desirable to have the magnetic head make an intimate contact with the magnetic recording medium along the width thereof (or along a direction perpendicular to the direction of the motion of the magnetic recording medium) over the whole width thereof.

To achieve such an intimate contact at all time, it is necessary that the magnetic head may freely tilt about an axis parallel to the motion of the recording medium since the magnetic medium may deflect as it passes along the detecting surface of the magnetic head and the magnetic recording medium may have some initial deformation, and that the magnetic head may freely move vertically with proper downward biasing force so as to accommodate the thickness of the recording medium and to maintain a close contact therewith.

Additionally, the positioning of the magnetic head must be accurate at all time since data is recorded in the magnetic medium over a narrow track and inaccuracy in the positioning of the magnetic head may cause reading or writing errors.

In other words, the retaining device must be flexible in its tilting and vertical motion but must be rigid otherwise.

Furthermore, in view of the fact that such a magnetic head is often used for finacial transactions, for instance in a cash dispenser, the retaining device for the magnetic head must be highly durable and must have a very high level of reliability.

SUMMARY OF THE INVENTION

Accordingly, it is the primary object of the present invention to provide a reliable magnetic head retaining device which can accurately write or read information into or out from a magnetic recording medium by achieving an accurate contact between the magnetic head and the magnetic recording medium.

It is a further object of the present invention to provide such a magnetic head retaining device which is protected against insertion of foreign matters thereto so as to achive a high overall reliability.

According to the most general aspect of the present invention, these and other objects are accomplished by providing a magnetic head retaining device, comprising a support member having fixedly secured thereto a magnetic head which contacts a magnetic recording medium moving in one direction relative thereto and at least a pair of support holes provided downstream and upstream to the magnetic head relative to the motion of the magnetic recording medium on an imaginary line passing through the magnetic head in parallel to the direction of the motion of the magnetic recording medium, and a mounting member having at least a pair of legs inserted through the corresponding support holes, a spring portion for biasing the legs downwards and a mounting end for fixedly securing the mounting member, each of the legs having a step which restricts the upward motion of the support member.

According to such a structure, since the magnetic head is retained in a floating manner, it may tilt about an axis parallel to the motion of the recording medium and is freely movable in a vertically direction, but is otherwise highly rigid, thus achieving a great freedom of motion to the magnetic head for its intimate contact with the magnetic recording medium without sacrificing the rigidity of the overall structure required for accurate positioning.

Further, according to a more particular aspect of the present invention, these and other objects are more particularly and concretely accomplished by forming the mounting member from a single plate bent into an L-shape with one portion thereof bifurcated into the legs each extending along the direction of the relative motion of the magnetic medium and the other end thereof forming the spring portion and the mounting end.

According to such a structure, since the mounting member consists of a single plate and the legs extend along the direction of the relative motion of the magnetic recording medium, the retaining device may acquire a rigidity required for accurate positioning of the magnetic head by means of an extremely simple structure.

Further, according to a more particular aspect of the present invention, these and other objects are more particularly and concretely accomplished by providing the support holes as slots which are elongated along the direction of the motion of the magnetic medium and which loosely accommodate the legs therethrough.

According to such a structure, since the support member may freely tilt about an axis parallel to the direction of the relative motion of the magnetic recording medium, the magnetic head can maintain a close contact with the recording medium even when the magnetic medium is subjected to a deflection.

Further, according to a yet more particular aspect of the present invention, these and other objects are more particularly and concretely accomplished by utilizing a part of the mounting member as the spring portion for allowing some vertical motion of the support member and for biasing the support member downwards.

According to such a structure, the downward biasing force may be obtained with a simple structure and the overall reliability of the device may be assured.

Further, according to a yet more particular aspect of the present invention, these and other objects are more particularly and concretely accomplished by utilizing the lower ends of the legs as stoppers for preventing the intrusion of any foreign matter which is thicker than a predetermined value and providng a guide means, preferably both upstream and downstream to the legs, which allows the motion of the support member substantially only along a direction perpendicular to the plane of the support member.

According to such a structure, the support member and the magnetic head are protected against any intrusion of foreign matters and the external forces which may be caused by tampering or by intrusion of a foreign matter.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 4 is a persepective view of another embodiment of the magnetic head retaining device according to this invention.

DESCRIPTION OF THE PREFERRED EMBODIMENTS

Figure 1:
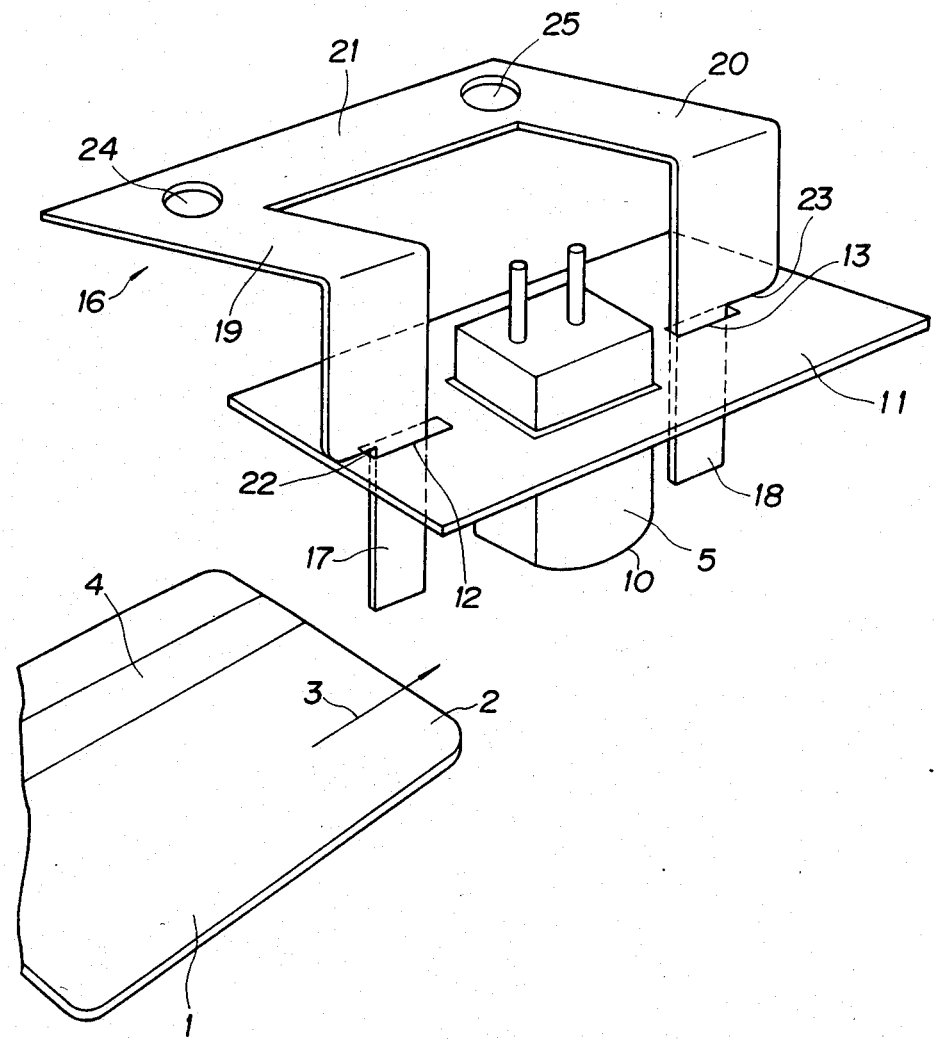
FIG. 1 is a perspective view of an embodiment of the magnetic head retaining device according to this invention.

The present invention will now be described with reference to the preferred embodiments thereof, and with reference to the appended drawings. FIG. 1 is a perspective view of an embodiment of this invention. A magnetic recording medium such as a magnetic card 1 consisting of a substantially elastic base plate 2 made of plastic material is provided with a strip of magnetic recording region 4 on one of its faces which extend along the direction of the motion of the magnetic card 1 indicated by an arrow 3. Data may be written into or read out from this magnetic recording region 4 as the magnetic card 1 passes along a magnetic head 5 and the magnetic recording region 4 slides along a detecting surface 10 of the magnetic head 5.

Figure 2:
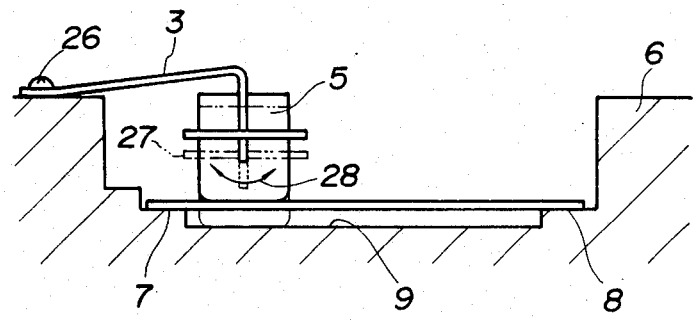
FIG. 2 is a sectional view of the embodiment of FIG. 1 taken along a line perpendicular to the direction of the motion of the magnetic card.

FIG. 2 is a sectional view taken along a line perpendicular to the direction of the motion 3. The magentic card 1 is conveyed, by a drive means not shown in the drawings, in a direction perpendicular to the paper of FIG. 2 along guide surfaces 7 and 8 provided in a depression 9 in a guide member 6. The guide surfaces 7 and 8 extends perpendicular to the paper of FIG. 2 along the direction of the motion 3 of the magnetic card 1. The depression 9 is provided for the purpose of preventing the friction between the lower face of the magnetic card 1 and the surface opposing thereto from wearing out the face of the magnetic card 1. According to this embodiment, the magnetic card 1 is conveyed while the magnetic head 5 is stationary, but a magnetic head 5 may be driven over a stationary magnetic card 5.

Figure 3:
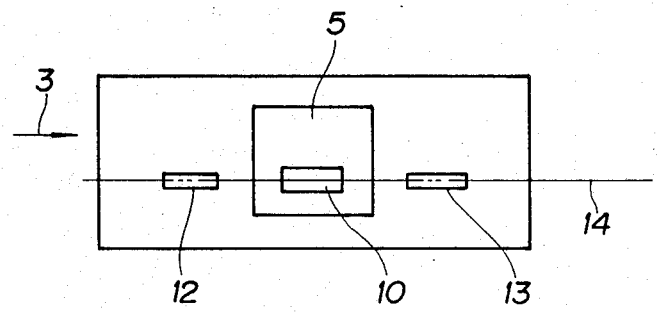
FIG. 3 is a bottom view of the support member of the embodiment of FIGS. 1 and 2.

This magnetic head 5 is fixedly secured to a substantially rigid, planar support member 11 with the magnetic detecting surface 10 thereof facing downwards. The support member 11 is provided with a pair of support holes 12 and 13, upstream and downstream ends thereof relative to the magnetic head 5 along the direction of the motion 3. These holes 12 and 13 are slots extending along an imaginary line parallel to the direction of the motion 3 and passing through the detecting surface 10 of the magnetic head 5, as most clearly shown in FIG. 3.

The mounting member 16 is formed by bending a substantially U-shaped single plate made of a substantially elastic material into an L-shape. This mounting member 16 is basically comprised of a pair of legs 17 and 18 and spring portions 19 and 20 connected thereto. The proximal ends of the spring portions 19 and 20 are connected to each other by way of a connecting portion 21. The length of the spring portions 19 and 20 may be appropriately selected so as to achive a desired flexibility. And the connecting portion 21 may extend to or beyond the line about which the mounting member 16 is bent into the L-shape as long as the connecting portion 21 does not interfere with other conponent parts. In this case, the spring portions 19 and 20 becomes incorporated into a single connecting portion.

Now, according to this particular embodiment shown in the drawings, when the spring portions 19 and 20 are in natural state, the legs 17 and 18 are perpendicular to the spring portions 19 and 20. The legs 17 and 18 extend downward and pass through the corresponding support holes 12 and 13. The legs 17 and 18 have steps 22 and 23, respectively, which extend along the direction of the motion 3. As the lower surfaces of the steps 22 and 23 engage with the upper surface of the support member 11, the support member 11 is restricted from moving towards the spring portions 19 and 20 (or, in other words, upwards in the sense of FIGS. 1 and 2).

The lower ends 17a and 18a of the legs 17 and 18 of the mounting member 16 are located slightly higher than the detecting surface 10 of the magnetic head 5 or the bottom of the depression 9 to which the detecting surface 10 is engaged under the biasing force of the spring portions 19 and 20. As a matter of fact, the lower ends 17a and 18a define the maximum height of the magnetic recording medium or any other foreign matter which may be permitted to be conveyed along the detecting surface 10. Additionally, a pair of holes 29 and 30 are provided upstream and downstream of the support holes 12 and 13, respectively, along the direction of motion 3 for receiving guide pins 31 and 32 extending vertically and fixedly secured to receiving members 31a and 32a fixed to a wall which is not shown in any detail in the drawings but is so disposed as not to interfere with the motion of the magnetic card 1. Thus, the lower ends 17a and 18a of the legs 17 and 18 protect the magnetic head retaining device against the intrusion of foreign matters, while the guide pins 31 and 32 and the guide holes 29 and 30 protect the support member 11 against undue external forces and also prevent the legs 17 and 18 from being disengaged from the corresponding support holes 12 and 13.

The connecting portion 21 formed in the proximal ends of the spring portions 19 and 20 is fixedly secured to a fixed position by screws 26 passed through mounting holes 24 and 25. The length of the parts of the legs 17 and 18 extending beyond the steps 22 and 23 is so selected that the legs 17 and 18 remain to be passed through the support holes 12 and 13 even when the magnetic head 5 engages with the bottom of the depression 9 and the support member 11 is located at the position indicated by an imaginary line 27. The vertical positions of the steps 22 and 23 are so selected that the spring portions 19 and 20 may deflect upwards as shown in FIG. 2 when the magnetic card 1 moves in the direction of the motion 3 along the guide surfaces 7 and 8 keeping a contact with the magnetic head 5.

The detecting surface 10 of the magnetic head 5 may thus contact the magnetic recording region 4 in spring loaded manner under the action of the spring portions 19 and 20. The magnetic head 5 and the support member 11 are swingable about the imaginary line 14 passing through the support holes 12 and 13, as indicated by numeral 28. Therefore, the detecting surface 10 of the magnetic head 5 may contact the magnetic recording region 4 over the whole width thereof, horizontally in FIG. 2 and vertically in FIG. 3, over which magnetic recording is to be made, according to the inclination of the magnetic card 1. Therefore, any writing or reading errors may be avoided through close contact between the detecting surface 10 and the magnetic recording region 4.

The detecting surface 10 of the magnetic head 5 is formed in arcuate shape about a straight line perpendicular to the direction of the motion 3. Therefore, even though the detecting surface 10 of the magnetic head 5 is initially engaged to the bottom of the depression 9, as the magnetic card 1 travels along the direction of the motion 3 or perpendicularly to the paper of FIG. 2, the magnetic card 1 may push up the magnetic head 5 upwards as shown in FIG. 2.

Thus, according to this invention, since the support member 16 is allowed to rotate about the line 14 parallel to the direction of the motion 3 of the magnetic card 1 and to deflect vertically at its spring portions 19 and 20 for vertical motion of its legs 17 and 18, the detecting surface 10 of the magnetic head 5 can closely follow the surface shape of the magnetic recording region 4 even when the magnetic card 1 is defected or intially deformed. Furthermore, because the detecting surface 10 of the magnetic head 5 is arcuate in shape, the magnetic card 1 can push up the magnetic head 5 against the biasing force of the spring portions 19 and 20 upon engagement thereto.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A magnetic head retaining device, comprising:
   a support member having fixedly secured thereto a magnetic head having a detecting surface which contacts a magnetic recording medium moving in one direction relative thereto and at least a pair of support holes provided downstream and upstream to the magnetic head relative to the motion of the magnetic recording medium on an imaginary line passing through the magnetic head in parallel to the direction of the motion of the magnetic recording medium; and
   a mounting member having at least a pair of leg portions inserted through the corresponding support holes so that said support member is tiltable about said imaginary line, spring portions for biasing the leg portion downwards relative to the plane of the support member and toward said magnetic recording medium, and a mounting end portion for fixedly securing the mounting member, each of the leg portions having a step which restricts the upward motion of the support member relative to said leg portions, thereby biasing said detecting surface of said magnetic head into contact with said magnetic recording medium.

2. A magnetic head retaining device according to claim 1, wherein the mounting member consists of a plate bent into an L-shape with one portion thereof bifurcated into the leg portions extending along the direction of the relative motion of the magnetic medium and the other end thereof forming the spring end and the mounting end portion.

3. A magnetic head retaining device according to claim 1, wherein the support holes consist of slots which are elongated along the direction of the motion of the magnetic medium and loosely accommodate the leg portions.

4. A magnetic head retaining device according to claim 3, wherein the spring portions are adapted to allow some upward motion of the support member and to bias the support member downwards.

5. A magnetic head retaining device according to claim 4, wherein a guide means is additionally provided permitting motion of the support member substantially only along a direction perpendicular to the place of the support member.

6. A magnetic head retaining device according to claim 5, wherein the guide means comprises a pair of pins which are fixedly secured to a fixed part and passed through a pair of guide holes provided in the support member, downstream and upstream of the leg portions of the mounting member on the imaginary line passing through the support holes and the magnetic head.

7. A magnetic head retaining device according to claim 6, wherein the ends of the downwardly biased leg portions are located slightly higher than the detecting surface of the magnetic head and together with a guide member for the magnetic recording medium define the maximum height of the magnetic medium which may be permitted to be conveyed along the detecting surface of the magnetic head.

* * * * *